United States Patent [19]

Koga

[11] 4,006,297
[45] Feb. 1, 1977

[54] TELEVISION SIGNAL CODING SYSTEM
[75] Inventor: Toshio Koga, Tokyo, Japan
[73] Assignee: Nippon Electric Company, Ltd., Tokyo, Japan
[22] Filed: Sept. 19, 1975
[21] Appl. No.: 614,986
[30] Foreign Application Priority Data
Sept. 20, 1974 Japan .............................. 49-108550
[52] U.S. Cl. ............................ 358/136; 178/DIG. 3
[51] Int. Cl.² .......................................... H04N 7/12
[58] Field of Search ................... 178/6, 6.8, DIG. 3
[56] References Cited
UNITED STATES PATENTS

| | | | |
|---|---|---|---|
| 3,739,085 | 6/1973 | Rosen | 178/6 |
| 3,748,379 | 7/1973 | Epstein | 178/6 |
| 3,784,737 | 1/1974 | Waehner | 178/6 |
| 3,840,698 | 10/1974 | Hinoshita | 178/6.8 |
| 3,898,378 | 8/1975 | Hinoshita | 178/6.8 |

Primary Examiner—Howard W. Britton
Attorney, Agent, or Firm—Sughrue, Rothwell, Mion, Zinn & Macpeak

[57] ABSTRACT

A television signal coding system is designed to avoid any increase in the volume of information transmitted resulting from transmission of unnecessary picture elements, while at the same time reducing the volume of address information required. The picture elements are compared one by one between successive frames, and the magnitude of the frame-to-frame differences is compared with a predetermined threshold value to determine whether the change is significant or not. A predetermined number of consecutive picture elements forms a unit region. A line of horizontal scan is divided into regions, each including a predetermined number of unit regions, and for each of such regions the decision is made as to whether it includes at least one significant unit region or not. Each of the significant regions is further divided, and for each of the resulting divisions the decision is made as to whether it is significant or not. In this manner, each scanning line is divided step by step until a train of significant unit regions is obtained. The code resulting from the several divisions is used as the address information.

4 Claims, 12 Drawing Figures

TELEVISION SIGNAL CODING SYSTEM

BACKGROUND OF THE INVENTION

This invention relates generally to transmission of television signals and more particularly to systems therefor using the correlation between frames to save the volume of information to be transmitted.

One of such television transmission systems previously known in the art is that proposed by J. C. Candy et al. in the article entitled "Transmitting Television as Clusters of Frame-to-Frame Differences", The Bell System Technical Journal, Vol. 50, No. 6, July - August, 1971, pp. 1889–1917. In that system, picture elements are each compared between successive frames and, when the magnitude of the frame-to-frame difference is greater than a predetermined threshold value, it is regarded as significant.

A considerable saving of data to be transmitted can be obtained by transmitting only those elements having a significant frame-to-frame difference but, in order to obtain a further saving, the techniques of ignoring significant changes in the picture that are isolated and coalescing runs of significantly changed elements that are separated by a small number of unchanged elements into a so-called "cluster" are employed. The technique of ignoring isolated changes is effective to obtain savings in the volume of bits required to signal changes of amplitude of picture elements and their addresses. The technique of coalescing runs or the so-called "bridging" technique further saves the volume of address data to be transmitted as runs of changed elements interrupted by three or less unchanged elements are transmitted in a continuous fashion as a cluster or bridged run. This techniques, however, naturally involves a disadvantage that the number of picture elements transmitted is unnecessarily increased because of the bridging element or elements included in the cluster which are insignificant in nature.

SUMMARY OF THE INVENTION

In view of the above, the present invention has for its object the provision of a novel television signal coding system of the kind described, which is designed to avoid any increase in the volume of information transmitted resulting from transmission of unnecessary picture elements while at the same time reducing the volume of address information required thereby reducing the whole volume of transmitted information more effectively than has been possible with the cluster-coding system.

According to the present invention, picture elements are compared one by one between successive frames, and the magnitude of the frame-to-frame differences is compared in a conventional manner with a predetermined threshold value to decide whether the change is significant or not and a predetermined number of consecutive picture elements, whether significant or not, forms a unit region. A certain length of horizontal scan, for example, a line of horizontal scan is divided into regions each including a predetermined number of unit regions and for each of such regions the decision is made as to whether it includes at least one the significant unit region or not. Each of the significant regions is further divided, and for each of the resulting divisions the decision is made as to whether it is significant or not. In this manner, each scanning line is divided step by step until a train of significant unit regions is obtained.

BRIEF DESCRIPTION OF THE DRAWINGS

The above and other objects, features and advantages of the present invention will become apparent from the following detailed description when taken in conjunction with the accompanying drawings, wherein.

DESCRIPTION OF THE PREFERRED EMBODIMENTS

Figure 1:
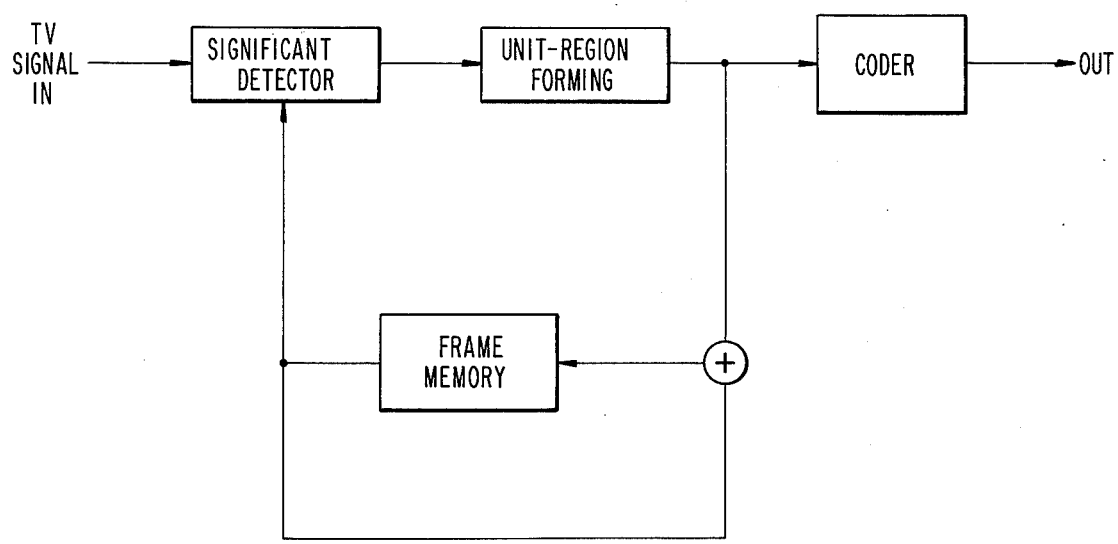
FIG. 1 is a block diagram illustrating the general arrangement of a television signal coding system of the present invention.

As diagrammatically illustrated in FIG. 1, in a coding system of the present invention, an input television signal is compared element by element between successive frames with an output of a frame memory and a decision is made as to whether the frame-to-frame difference is significant or not. Only when at least a predetermined number of significant elements are found in any single unit region previously defined, data for the elements constituting such unit region are fed to a coder and utilized to update the content of a frame memory. At the same time, a first code is assigned to the significant unit regions and a second code to the remaining, insignificant unit regions.

In the coder, the coding process is carried out in the following manner. First $N_1, N_2, N_3, \ldots$ are assumed to be integers larger than one and a definite length of signal is primarily divided into $N_1$ regions on a time basis. Any one of the primary regions which includes at least one significant unit region is assigned with a first code, for example, in the form of logical "1" and the remaining regions are all assigned with a second code for example, in the form of logical "0". Each of the primary regions coded 1 is further divided into $N_2$ regions, which are assigned with a code 1 or 0 in the same manner as described above. The secondary regions coded 1 are further divided into smaller regions. In this manner the dividing and coding process is repeated until unit regions of a size including a predetermined number of picture elements are obtained. The codes assigned to the primary, secondary and other regions including unit regions finally obtained, address data or positional information of significant picture elements contained in each of the significant unit regions, and codes demarcating such groups of regions from each other are transmitted in a predetermined order.

The signal dividing process described above will next be explained more specifically with reference to FIGS. 2 and 3.

In order to simplify the explanation, it is assumed here that numbers $N_1, N_2, N_3, \ldots$ are all four and that division is effected at all times into equal parts. It is further assumed that the signal is divided into groups one for each single scanning line which consists of 64 unit regions.

Figure 2:
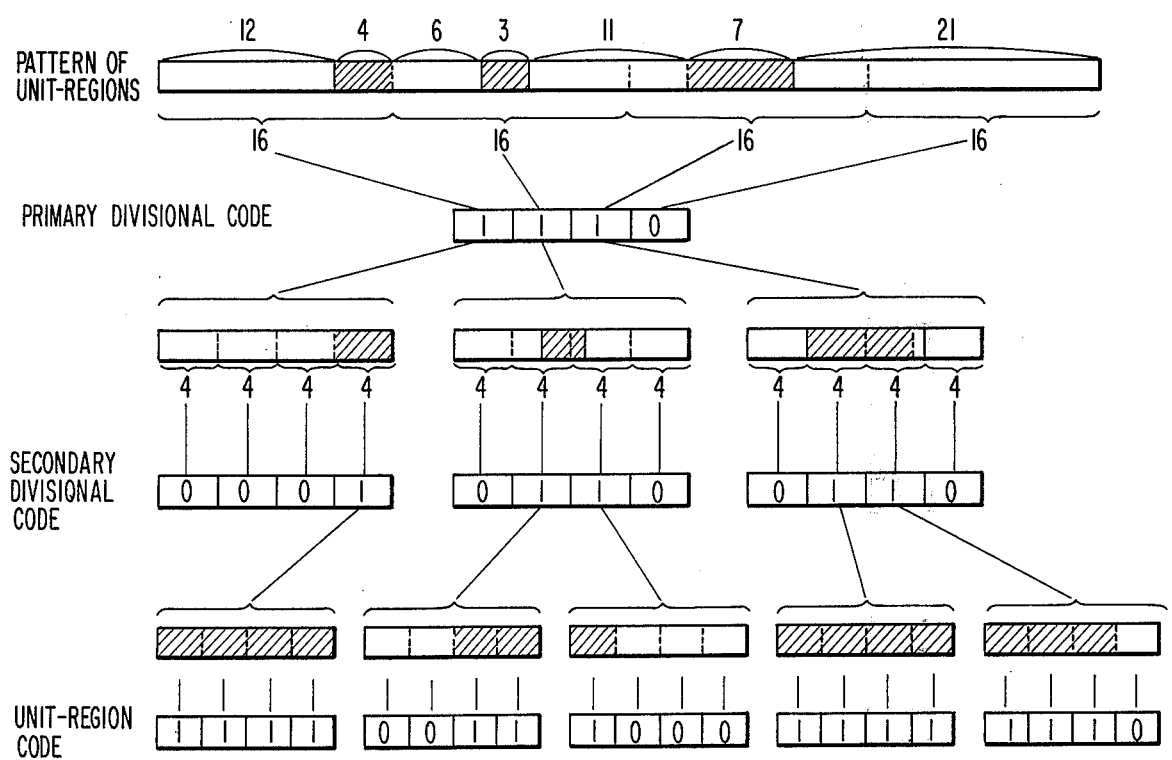
FIG. 2 is a diagram showing a typical mode of divisional coding according to the principles of the present invention.

In FIG. 2, the pattern of occurrence of significant unit regions or unit regions coded 1 is indicated by hatching, the numeral figures attached representing the respective lengths of runs of consecutive significant and insignificant unit regions. Since, as stated above, the numbers $N_1, N_2, N_3, \ldots$ in this example are all four, the scanning line is primarily divided into parts each including 16 unit regions and secondarily into parts including 4 unit regions. As illustrated, the primary division gives a code of 11 10, which includes three 1's. In the primary regions, those coded 1 are further divided into four secondary regions, giving a code of secondary division formed of twelve bits, $3 \times 4 = 12$, including five 1 bits each representing a significant secondary region. As illustrated, the five significant secondary regions jointly include a total of 20 (= $5 \times 4$) bits as a unit region code. Accordingly, in this illustration, the positions of significant unit regions included in the scanning line can be represented by a code of 36 (= 4 + 12 + 20) bits. Incidentally, the picture elements included in each of the significant unit regions are coded independently from the above-described divisional coding process, as will be described later in detail, and their codes are transmitted in combination with the group of divisional codes in a predetermined order.

Figure 3A:
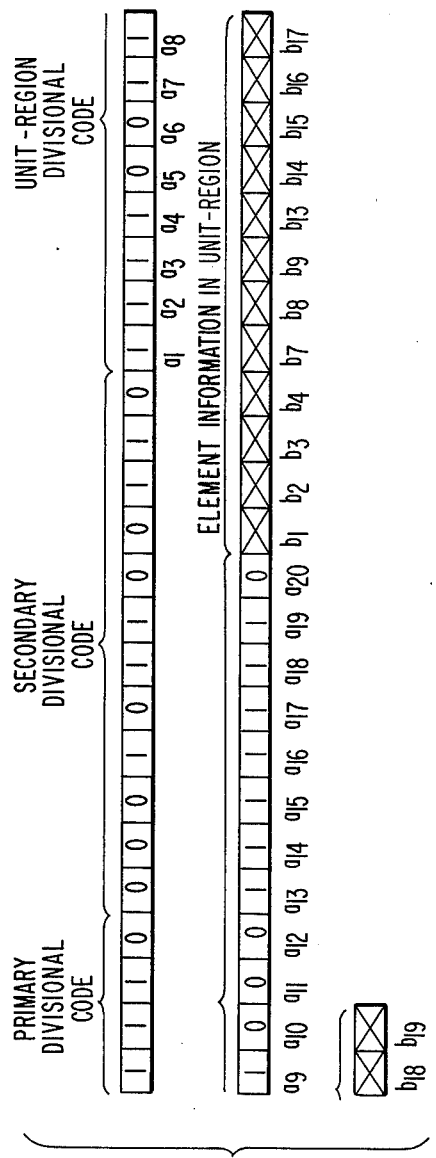
FIGS. 3(A) and 3(B) illustrate two examples of code train obtainable with the divisional coding mode shown in FIG. 2.

For instance, the code transmission is effected in the order of a primary divisional code, a secondary divisional code and codes of respective unit regions followed by value and address codes of the picture elements included in significant unit regions, as illustrated in FIG. 3(A). In this code arrangement, $a_1, a_2, a_3, \ldots a_{20}$ represent the codes of the respective unit regions included in significant secondary divisional regions and $b_1, b_2, b_3, b_4, b_7, b_8$, etc. represent the value and address codes of the respective picture elements in the unit regions coded 1.

Figure 3B:
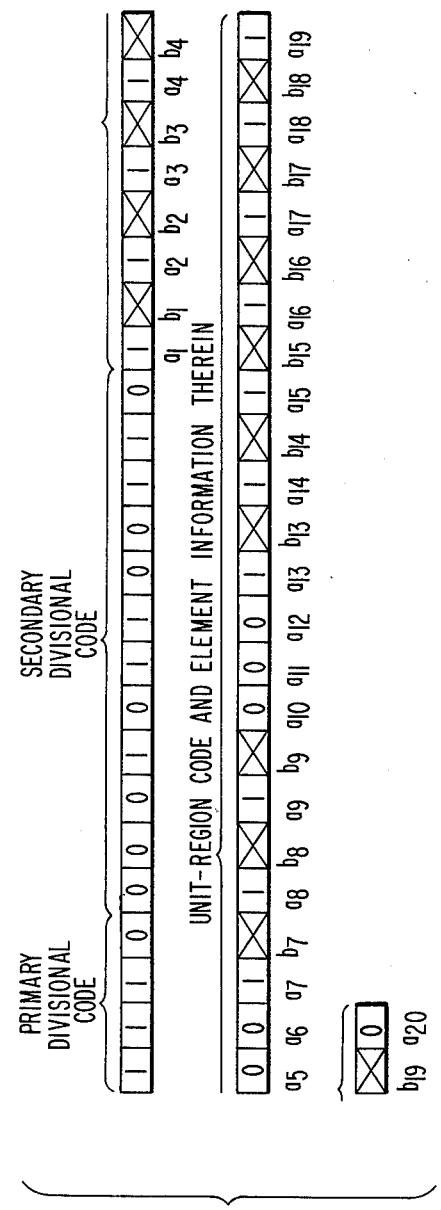

It is to be understood that, if desired, the value and address codes of the respective picture elements in each significant unit region may be arranged immediately after the code of the unit region, as illustrated in FIG. 3(B).

It will be apparent that the code pattern shown in FIGS. 3(A) and 3(B) may be replaced by one representing the code difference between the scanning line and the next preceding one or by one including the code differences between neighboring unit regions in a scanning line without necessitating any modification of the dividing process described.

Description will next be made of one preferred embodiment of the present invention with reference to FIGS. 4 to 7. For the sake of simplicity, it is again assumed that horizontal scanning lines are each represented by a group of codes and that the numbers $N_1$ and $N_2$ are both four, each scanning line including 64 unit regions and 256 picture elements (or four picture elements in each unit region). Assumption is made also that division is effected at all times into equal parts.

Figure 4:
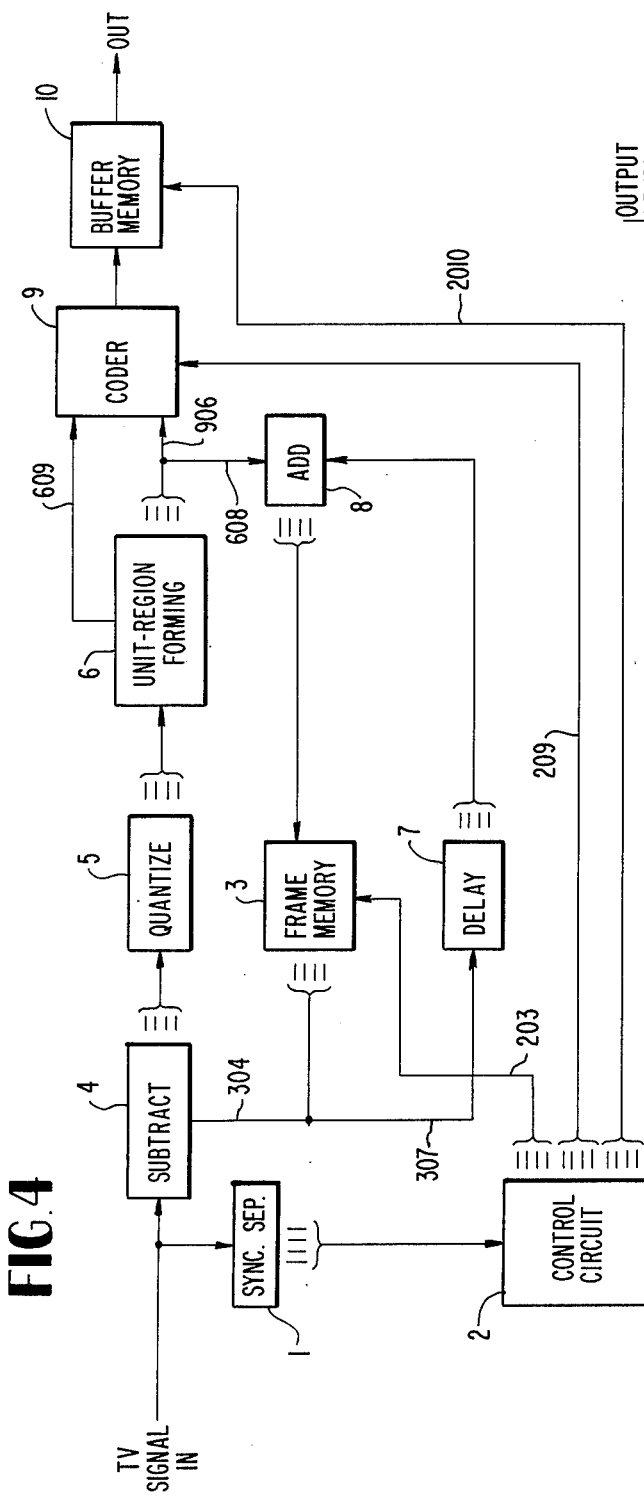
FIG. 4 is a block diagram illustrating one preferred embodiment of the present invention.
Figure 5:
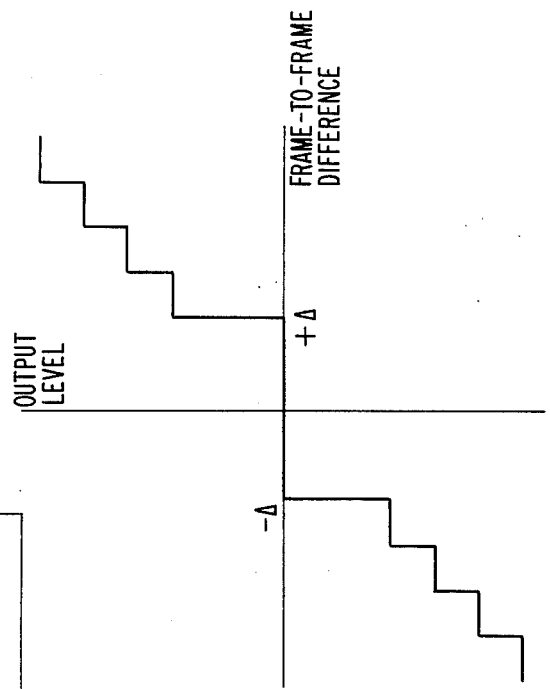
FIG. 5 is a coordinate diagram showing a quantization characteristics required of a quantizer shown in FIG. 4.

Referring first to FIG. 4, an input television signal is fed to a sync separator 1 and a subtractor 4. Sychronizing signals separated at the sync separator from the input television signal are fed to a control circuit 2. The whole transmitting system operates under control of such synchronizing signals. At the subtractor 4, subtraction is effected between the input television signal and the reference fed to the subtractor in the form of the output of a frame memory 3 and the result or difference obtained is fed to a quantizer 5, which has operating characteristics shown in FIG. 5 Namely, the quantizer 5 produces a zero output when the output of subtractor 4 is within the range of $\pm \Delta$, indicating that the difference is insignificant and produces an output which is not zero when the subtractor output is out of the range of $\pm \Delta$, indicating the difference is significant. In this manner, the quantizer 5 has an additional function of deciding whether or not the difference is significant.

The output of the quantizer 5 or the frame-to-frame difference is fed to a unit-region forming circuit 6 and each of the unit regions formed is given a unit region code $a$ depending upon the number of significant picture elements included in the unit region, the code $a$ being a logical 1 for unit regions including at least a predetermined number of significant picture elements and a logical 0 for the remaining unit regions. The unit region code $a$ and the output of quantizer 5 delayed to such an extent as required for the formation of unit regions in the unit-region forming circuit 6 are fed to a coder 9 through respective lines 609 and 906. The delayed output of the quantizer 5 is also fed through a line 608 to an adder 8 and is added to the output of the frame memory 3, which is fed to the adder through line 307 and a delay circuit 7. The output of the adder 8 is utilized to update the content of the frame memory 3.

Figure 6:
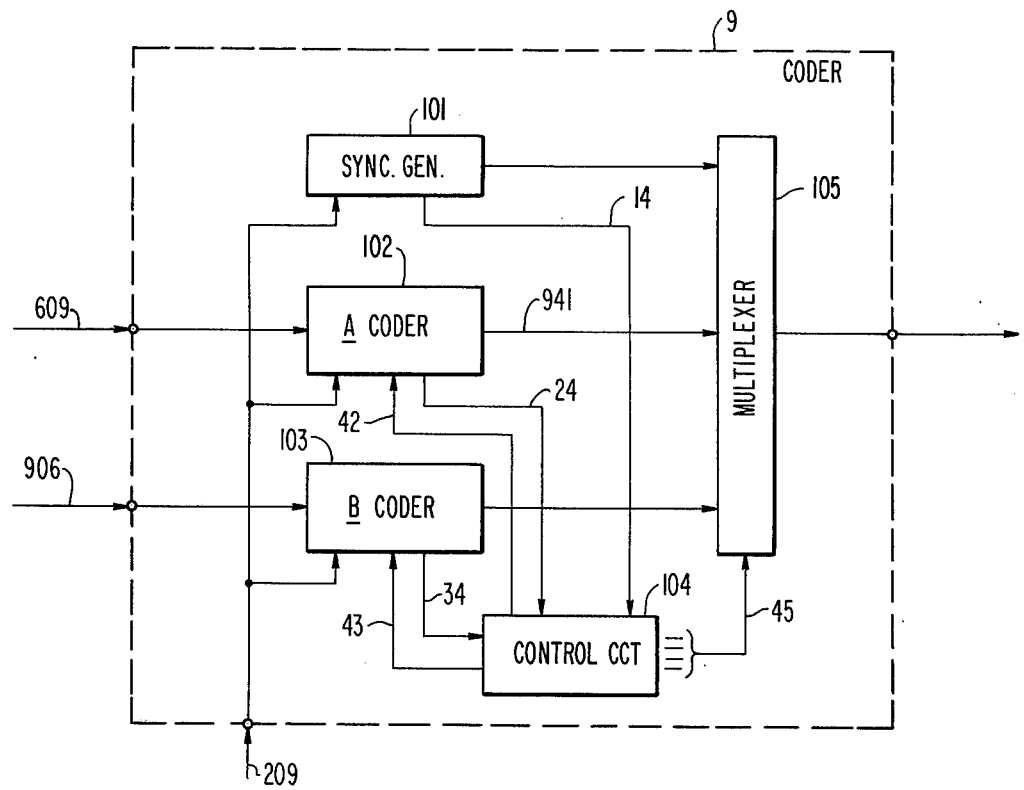
FIG. 6 is a detailed block diagram of the coder shown in FIG. 4.

Description will next be made of the operation of the coder 9 with reference to FIG. 6, assuming that the code arrangement shown in FIG. 3(A) is employed.

The output synchronizing signals from the control circuit 2 (FIG. 4), including clock pulses and horizontal and vertical synchronizing signals, are fed through a line 209 to a synchronizing code generator 101, an $a$ coder 102 and a $b$ coder 103. The synchronizing code generator 101 produces one or the other of two predetermined bit patterns respectively corresponding to the horizontal and vertical synchronizing signals each time either synchronizing signal is fed thereto and its output is fed to a multiplexer 105, which is arranged to select the bit pattern as its output under the command of a control circuit 104. When the synchronizing code generator 101 has completed its operation to produce a horizontal synchronizing signal, a completion signal is fed through a line 14 to the control circuit 104 and the latter, employing the signal, enables the $a$ coder 102 through a line 42 to start operation, while at the same time controlling the multiplexer 105 to select the output of the $a$ coder 102. Subsequently, when the divisional coding has been completed in the $a$ coder 102, a completion signal is fed through a line 24 to the control circuit 104 and the latter, utilizing the signal, enables the $b$ coder 103 through a line 43 to start operation while at the same time controlling the multiplexer 105 to select the output of the $b$ coder 103. Upon completion of the operation of b coder 103 to code the value and address informations of picture elements in the unit region, a completion signal is fed through a line 34 to the control circuit 104 and the multiplexer 105 is controlled so as to select the output of the synchronizing code generator 101. With the process described, starting with production of a horizontal synchronizing signal and ending with operation of the b coder 103, a single scanning line is completely coded in the manner illustrated in FIG. 3(A). Of course, for a field or frame, such coding process is repeated for all the scanning lines forming the field or frame, and at the beginning of the next field or frame, a bit pattern corresponding to a vertical synchronizing signal is inserted.

Figure 7:
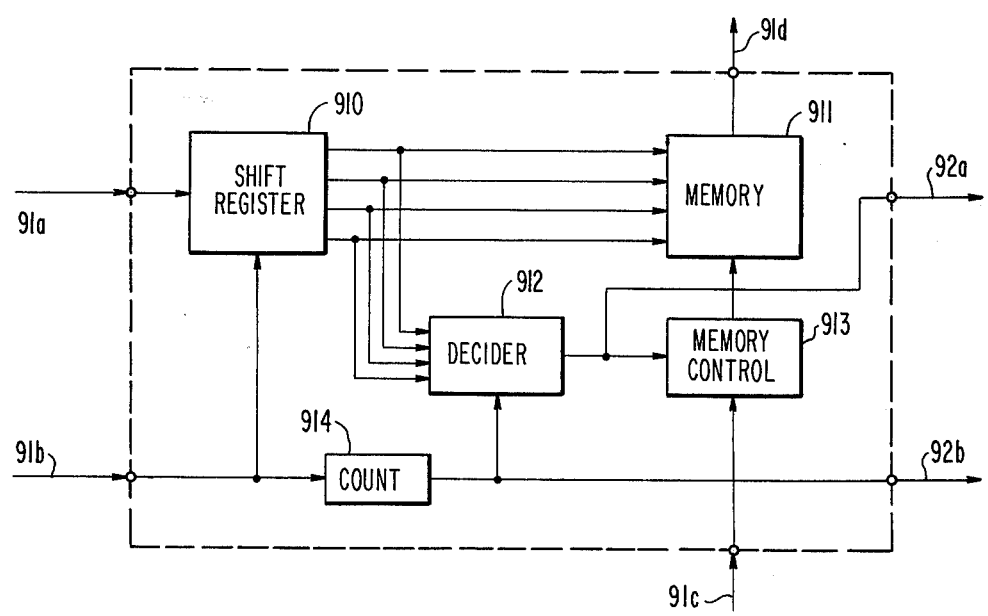
FIGS. 7 and 8 are block diagrams respectively showing the basic circuit formation and the whole arrangement of one of the coder units shown in FIG. 6.
Figure 8:
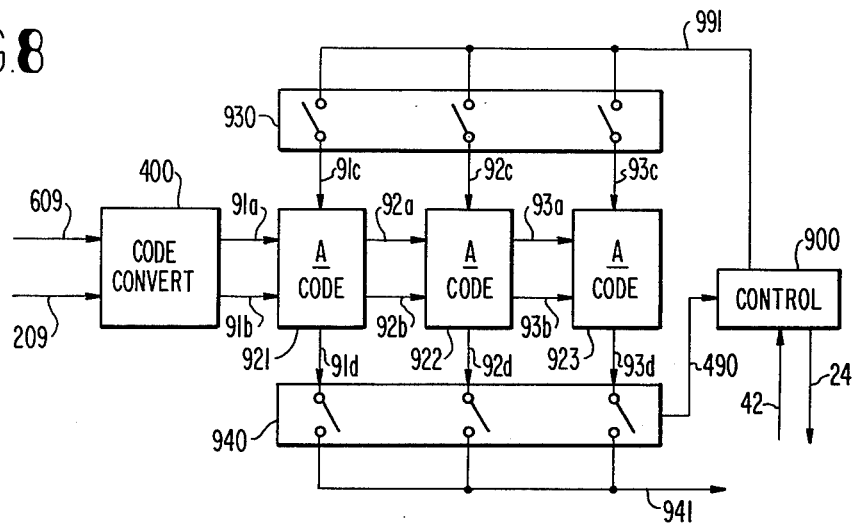

Reference will next be made to FIGS. 7 and 8, which show the detail structure of the a coder 102.

In FIG. 7, binary signals, each indicating whether the unit region is significant or not, are fed to a terminal 91a through a code converter circuit 400 (see FIG. 8) and successively stored in a shift register 910. In this embodiment, it is assumed that the code converter circuit 400 is short-circuited. Clock pulses, which are employed to sample the binary signals on a time basis, are fed through another terminal 91b to the shift register 910 and a counter circuit 914, which counts the signals sampled. The frequency of the clock pulses is one-fourth that of the master clock pulses flowing through the whole transmitting system as in this embodiment the unit regions each include four picture elements arranged horizontally adjacent to each other. The counter circuit 914 delivers a timing pulse to a decision circuit 912 and an output terminal 92b each time its count reaches four. The shift register 910 stores four data bits and delivers its content to the decision circuit 912 and a memory 911. The decision circuit 912 decides whether the four data bits are all 0 or not each time it is fed with a timing pulse from the counter circuit 914 and the decision output is delivered to another output terminal 92a and a memory control circuit 913. In the event that the output of the decision circuit 912 is 0, indicating that the four data bits are all 0, the memory control circuit 913 inhibits the data writing in the memory 911 and, in the event that the decision output is 1, indicating that at least one of the four data bits is 1, the memory control circuit 913 allows the memory 911 to store the four-bit data bits while allocating an address therefor. The basic circuit of FIG. 7 repeats such operation until all the data for one scanning line have been supplied and, in this manner, a train of unit region codes, for example, as shown in FIG. 2, are written in the memory 911. It will be understood that the primary and secondary divisional codings are obtainable simply by a cascade connection of a plurality of such unitary circuits as illustrated in FIG. 7.

FIG. 8 illustrates the whole arrangement of the a coder 102, which includes a cascade connection of unitary circuits indicated at 921, 922 and 923. As observed, the output terminals of the first unitary circuit 921 are connected to the input terminals of the second unitary circuit 922, the output terminals of which are connected to the input terminals of the third unitary circuit 923.

In the first unitary circuit 921, data input thereto is divided into four-bit portions, a decision is made as to whether each is significant or not, and the results are produced at one of the output terminals 92a, of the circuit. Timing pulses of the decision output are produced at the other output terminal 92b. Accordingly, in the memory of the secondary unitary circuit 922, which operates in quite the same manner as the first unitary circuit 921, a secondary divisional code is stored. Similarly, a primary divisional code is stored in the memory of the third unitary circuit 923. Incidentally, in the case of this embodiment, as the primary divisional code to be stored in the last, third unitary circuit 923 includes only four bits, the storing function may be served by the shift register, if desired, and the memory unit is not always needed in the circuit.

Upon completion of the coding process for a single scanning line, such code sequence as illustrated in FIG. 3(A) can be obtained as a coder output by successively reading out the contents of the memories in the respective unitary circuits. For example, the data stored in the memory 911 of the first unitary circuit shown in FIG. 7 are successively read out of the respective addresses in the memory upon arrival of a read start pulse at the input terminal 91c of the memory control circuit 913 under the control thereof and delivered through the output terminal 91d of the memory 911. In the coder arrangement of FIG. 8, a read-out signal 991 entering a switching circuit 930 is switched successively to reach the input terminals 93c, 92c and 91c of the respective unitary circuits 923, 922 and 921. The code outputs appearing at the respective memory output terminals 93d, 92d and 91d of the unitary circuits 923, 922 and 921 are fed to another switching circuit 940 to be successively transferred through a line 941 to the multiplexer 105. The a coder as a whole operates under the control of a control circuit 900, which serves a number of functions of supplying a read-out signal, receiving through the line 42 an instruction to start operation of the a coder, confirming through a line 490 the end of data reading operation, and delivering through the line 24 a signal indicating completion of an a coder operation.

The unitary circuit 921 is fed with input data through the code converter circuit 400. In this embodiment, the code train as fed to the code converter circuit 400 through a line 609 is directly transferred to the input terminal 91a of the unitary coder circuit 921 while the master clock for the entire transmitting system being fed through a line 209 to the code converter circuit is frequency-divided according to the length of unit regions in which the signal input is to be divided and the resulting output clock having a frequency corresponding to a quarter that of the master clock is fed to the input terminal 91b of the unitary circuit 921.

As regards the b coder 103, though various modes of operation are contemplated, description will be made here of the coder operation in the case where only significant picture elements in each unit region are transmitted.

Figure 9:
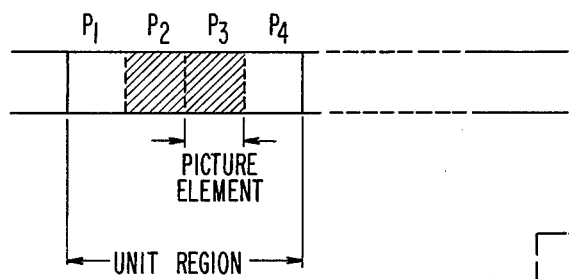
FIG. 9 is a diagram showing a size of unit regions and a manner of addressing significant picture elements included in a unit region.

FIG. 9 illustrates a unit region including two significant picture elements $p_2$, $p_3$ and the remaining two, insignificant elements $p_1$, $P_4$ and the positions of the four picture elements can be represented by four bits, 0110. Accordingly, the positional and value informations of significant picture elements of the unit region can be represented by a code in the form of 0110 $p_2$ $p_3$. Obviously, any of the other unit regions can be represented in quite the same manner.

Figure 10:
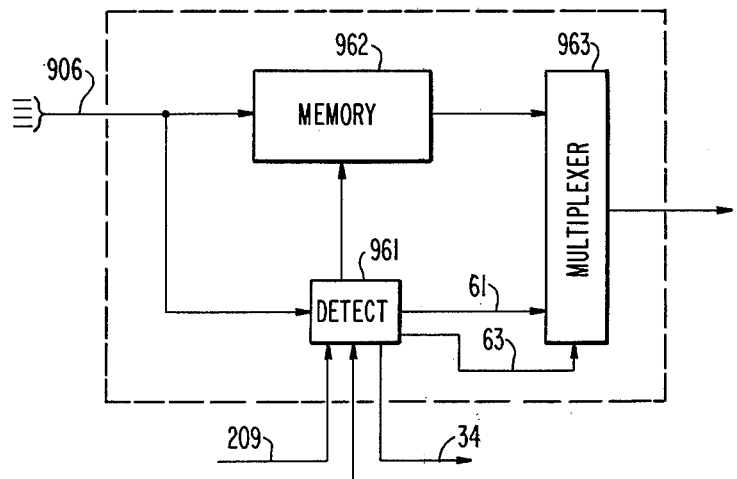
FIG. 10 is a detailed block diagram showing the other coder unit shown in FIG. 6.

The b coder 103, illustrated in FIG. 10, operates as follows. Value information of each picture element is fed to a memory 962 and a detector circuit 961. Upon receiving an operation start signal through the line 43, the detector circuit 961 operates to send a write instruction to a memory 962 each time the circuit is fed with a value information of a picture element which is significant. It is to be understood that the memory 962 is sized to match the time of delay occurring in the $a$ coder. The positional information of any significant picture element is fed through a line 61 to a multiplexer 963. Also, the value information stored in the memory 962 is read out serially bit by bit to be fed to the multiplexer 963, in which the positional and value informations of the picture elements are properly selected under the control of a signal fed through a line 63 to the multiplexer. When the process of coding the picture elements included in all of the unit regions of one scanning line has been completed, a completion signal is issued through the line 34 to the control circuit 104 of the coder 9 (FIG. 6). Master clock pulses are fed to the coder through line 209. The output of coder 9 operating in the manner described is fed to a buffer memory 10 (FIG. 4), where the irregular rate of information occurring in the transmitting system is smoothed to match the rate of transmission of the associated transmission channel.

Though, in the embodiment described above, the code arrangement obtained is of the kind illustrated in FIG. 3(A), it will be apparent that the code arrangement illustrated in FIG. 3(B) may readily be realized by slightly altering the read-out timing of the $a$ coder 102 and $b$ coder 103. That is to say, in the coding of unit regions following the secondary divisional coding whenever a unit region code of 1 takes place, the value and positional information codes of the picture elements included in the unit region are arranged to immediately follow the unit region code, any unit region code of 0 being followed directly by the code of the next unit region. To this end, instead of supplying a completion signal through line 24 in FIG. 6, an instruction signal is supplied to the $b$ coder for each unit region code of 1 so that the value and positional informations of the picture elements in the significant unit region are read out and no such instruction signal is supplied for any unit region codes of 0.

It will be appreciated that the above-described embodiment and modification thereof are particularly advantageous in transmission of pictures of which unit regions are coded 0 only at a limited frequency.

Figure 11:
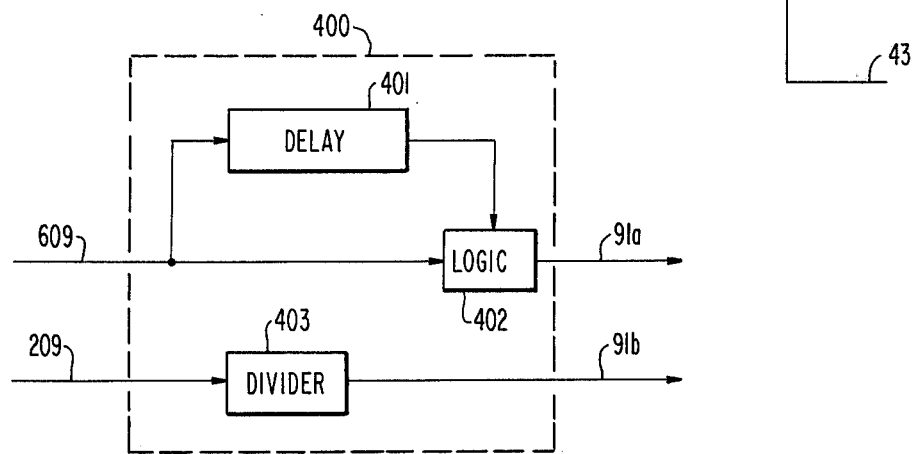
FIG. 11 is a block diagram illustrating a modified form of code converter circuit usable in the system of the present invention.

Further, in connection with the $a$ coder in the coder system 9, it is to be recognized that the train of unit region codes can be converted into an appropriate differential code train. In other words, the same differential coding as described of the embodiment illustrated can be effected by feeding the $a$ coder only with the differences between a train of unit region codes for a scanning line and that obtained for the preceding scanning line instead of feeding the unit region codes themselves. In this case, the $b$ coder remains unchanged in operation and, at the receiving end, the pattern of unit region codes is obtained by superimposing the decoded version of such code pattern of a scanning line on the code pattern of the next preceding scannning line. To serve the purpose, the code converter circuit 400 shown in FIG. 8 is constructed as illustrated in FIG. 11. Unit region codes are fed through line 609 to a delay circuit 401 and a logic circuit 402. It is to be understood that the delay circuit 401 is made capable of storing all the unit region codes for a single scanning line and that the logic circuit 402 gives an exclusive-OR function of two inputs thereto. The output of logic circuit 402 is thus an exclusive-OR between the unit region codes of a scanning line and those of the next preceeding one and fed to the input terminal 91$a$ (FIG. 8) The master clock supplied to the transmitting side through line 209 is first fed to a frequency divider circuit 403 and the output timing pulses each representing a unit region are fed to the input terminal 91$b$.

With this arrangement, it will be observed that the range of propagation of any error possibly occurring during the transmission can be minimized by renewing the initial value for the code pattern at an appropriate time. Such arrangement is also advantageous particularly in transmitting pictures which produce like code patterns in a vertical arrangement since each train of unit region codes is replaced by its difference from that of the next preceding scanning line.

Further, in the differential coding system, the delay circuit 401 may be made to have a delay time corresponding to the time period of a single unit region and the differential coding between neighboring unit regions is of great advantage in cases where the same code is repeated in a horizontal direction of scan.

Moreover, as long as the size of unit regions is selected to include a number of picture elements which is a power of 2 (two), the coding of picture elements in the unit region being transmitted may be subjected to an orthogonal transformation, if desired. Namely, the $b$ coder 103 (FIG. 6) at the transmitting end may be replaced by an orthogonal transformation coder for orthogonal transformation of the frame-to-frame differences in each significant unit region. Orthogonal transformation is also readily applicable to the original input television signal by supplying it directly to the coder. As the orthogonal transformation is effected for unit regions each including a power of 2 of picture elements, its application to the present invention is quite easy and highly profitable.

It will be understood that DPCM coding of significant unit regions only can be obtained by substituting a DPCM coder for the $b$ coder 103 (FIG. 6) and supplying the input television signal directly to the coder side of the arrangement of FIG. 4. As for a reference level, any appropriate picture element in each unit region can be selected. The system arrangement is otherwise the same as that of the first embodiment described except that a gate circuit is provided so that the DPCM-coded information of picture elements of a unit region is selected only when the corresponding output of the unit-region forming circuit is 1 and ignored when such output is 0.

What is claimed is:

1. A television signal coding system for coding a television signal by the use of frame correlation techniques, said television signal consisting of a series of frames each defined by horizontal and vertical synchronizing signals and each representing a number of two-dimensionally arranged picture elements of an optical image to be transmitted, said coding system including means for sequentially comparing every two successive frames to produce a binary difference signal consisting of significant and insignificant digits representing respectively that the difference of said frame-to-frame comparison is greater and smaller than a predetermined value for each said picture element, said binary difference signal being deviated into a series of unit regions each having a predetermined number of binary digits; wherein the improvement further comprises:

first means responsive to said binary difference signal for generating a first or a second binary code for each said unit region depending on whether or not the unit region has said significant digits exceeding in number a predetermined value to designate significant regions;

second means connected to said first means and responsive to said first and second binary codes for generating a demarcation code to divide said binary difference signal into groups each covering a predetermined number of said unit regions;

third means connected to said second means and responsive to the code pattern consisting of said first and second binary codes included in each of said groups for generating a unit-region position code representing the position of said significant unit regions in each of said groups;

fourth means connected to said third means for generating for each said significant unit regions a picture element position code representing the position of each significant bit included in said binary difference signal; and fifth means connected to receive the outputs of said second, third and fourth means for arranging in a predetermined order and in a time relationship said demarcation code, said unit-region position code, and said picture element position code.

2. A television signal coding system as recited in claim 1 wherein the improvement further comprises:

sixth means responsive to said binary difference signal for temporarily storing value information of each picture element which is significant corresponding to said first binary code; and seventh means connected to receive the outputs of said fifth and sixth means for arranging in a predetermined order and in a time relationship the codes from said fifth means and the value information stored in said sixth means.

3. A televison signal coding system for coding a television signal by the use of frame correlation techniques, said television signal consisting of a series of frames each defined by horizontal and vertical synchronizing signals and each representing a number of two dimensionally arranged picture elements of an optical image to be transmitted, said coding system comprising:

first means for storing a reference information corresponding to a previously transmitted frame;

second means connected to receive an input television signal and the reference information stored in said first means for sequentially comparing every two successive frames to produce a difference signal;

third means connected to said second means for quantizing said difference signal to produce a quantized signal consisting of significant and insignificant digits representing respectively that the difference of said frame-to-frame comparison is greater and smaller than a predetermined value for each said picture element, said quantized signal being deviated into a series of unit regions each having a predetermined number of binary digits; and fourth means connected to receive the outputs of said first and third means for producing a binary sum signal to update said reference information in response to the significant digits produced by said third means;

fifth means connected to said third means and responsive to said quantized signal for generating a first or a second binary code for each said unit region depending on whether or not the unit region has said significant digits exceeding in number a predetermined value to designate significant regions;

sixth means connected to said fifth means and responsive to said first and second binary codes for generating a position code representing the position of each significant bit in said quantized signal, said position code including codes representing divisions of the horizontal scan into groups of said unit regions, unit-region positional codes and picture element position codes;

seventh means connected to said fifth means for temporarily storing value information of each picture element which is significant; and eighth means connected to receive the outputs of said sixth and seventh means for arranging in a predetermined order and in a time relationship the position code and the value information of each picture element which is significant.

4. A television signal coding system as recited in claim 3 wherein said sixth means comprises:

ninth means responsive to said first and second binary codes for generating a demarcation code to divide said quantized signal into groups each covering a predetermined number of said unit regions;

tenth means connected to said ninth means and responsive to the code pattern consisting of said first and second binary codes included in each of said groups for generating a unit-region position code representing the position of said significant unit regions in each of said groups; and eleventh means connected to said tenth means for generating for each said significant unit regions a picture element position code representing the position of each significant bit included in said quantized signal, said demarcation code, said unit-region position code, and said picture element position code comprising said position code.

* * * * *